United States Patent [19]

McNaul et al.

[11] 4,266,226

[45] May 5, 1981

[54] SIDELOBE DISCRIMINATOR

[75] Inventors: William F. McNaul, Escondido; Paul R. Eberhardt, San Diego, both of Calif.

[73] Assignee: Cubic Corporation, San Diego, Calif.

[21] Appl. No.: 75,140

[22] Filed: Sep. 12, 1979

[51] Int. Cl.[3] .................... H04B 7/00

[52] U.S. Cl. .................... 343/100 LE

[58] Field of Search .................... 343/100 LE, 100 CL, 343/100 CS; 325/323, 324, 472, 39, 59, 60; 179/15 AN; 455/278

[56] References Cited

U.S. PATENT DOCUMENTS

| | | | |
|---|---|---|---|
| 3,248,731 | 4/1966 | Bickmore et al. | 343/100 LE |
| 3,427,621 | 2/1969 | Brunner | 343/100 LE |
| 3,735,266 | 5/1973 | Amitay | 325/60 |
| 4,129,873 | 12/1978 | Kennedy | 343/100 LE |

*Primary Examiner*—Theodore M. Blum
*Attorney, Agent, or Firm*—Brown & Martin

[57] ABSTRACT

Systems for discriminating between signals on the mainbeam of an antenna and signals on the sidelobes of the antenna are disclosed. In one system, sidelobe discrimination is accomplished by positioning an auxiliary antenna relative to a collecting antenna for receiving signals arriving on the radiation pattern of the auxiliary antenna substantially coincident with the receipt of signals by the collecting antenna on the sidelobes of the collecting antenna; modulating the signals received by the auxiliary antenna to have a predetermined modulation pattern; providing received signals in response to both the signals collected by the collecting antenna and the modulated signals; and detecting the received signals having the predetermined modulation pattern, to thereby discriminate the detected signals as being coincident with the signals arriving on the sidelobes of the collecting antenna, and for providing an identification signal to indicate whether the received signal is coincident with signals arriving on the sidelobes of the collecting antenna. In another system, signals arriving on the sidelobes of a collecting antenna array are modulated in response to modulation signals provided to the feed network of the antenna array. Corresponding systems for discriminating between signals transmitted on the mainbeam and sidelobes of a transmitting antenna and between signals transmitted on the mainbeam and sidelobes of a transmitting antenna array also are disclosed.

28 Claims, 7 Drawing Figures

SIDELOBE DISCRIMINATOR

CROSS REFERENCE TO RELATED APPLICATION

This patent application is related to a co-pending application by William F. McNaul, one of the co-inventors herein, entitled "Sidelobe Discriminator" filed on even date herewith.

BACKGROUND OF THE INVENTION

The present invention generally pertains to antenna systems and is particularly directed to a system for discriminating between signals arriving on the mainbeam of a collecting antenna and signals arriving on the sidelobes of the antenna.

A communications receiver coupled to a collecting antenna receives signals that arrive on either the mainbeam or the sidelobes of the antenna. It is important to be able to discriminate between the signals arriving on the mainbeam and the signals arriving on the sidelobes. This is particularly true in a communications system wherein the antenna is designed to track the direction of arrival of the signal received on the main beam. Although the magnitude of the mainbeam signals are usually sufficiently greater than the magnitude of the sidelobe signals to enable discrimination between the respective received signals based upon their relative magnitudes, in some communication systems and/or environments the magnitudes of the respective received signals are not sufficiently different to enable reliable discrimination between them.

SUMMARY OF THE INVENTION

The present invention enables signals arriving on the sidelobes of a collecting antenna to be discriminated from the signals arriving on the main beam of the antenna without regard for the relative magnitudes of these signals.

According to one aspect of the present invention, sidelobe discrimination is accomplished by positioning an auxiliary antenna relative to the collecting antenna for receiving signals arriving on the radiation pattern of the auxiliary antenna substantially coincident with the receipt of signals by the collecting antenna on the sidelobes of the collecting antenna; modulating the signals received by the auxiliary antenna to have a predetermined modulation pattern; providing received signals in response to both the signals collected by the collecting antenna and the modulated signals; and detecting the received signals having the predetermined modulation pattern, to thereby discriminate the detected signals as being coincidental with the signals arriving on the sidelobes of the collecting antenna, and for providing an identification signal to indicate whether the received signal is coincident with signals arriving on the sidelobes of the collecting antenna.

According to another aspect of the present invention, sidelobe discrimination between signals arriving on the mainbeam and sidelobes of a collecting antenna array is accomplished by modulating signals arriving on the sidelobes of the array to have a predetermined modulation pattern; and detecting signals having the predetermined modulation pattern to thereby discriminate the detected signals as being received from signals arriving on the sidelobes.

The present invention also provides corresponding systems and methods for discriminating between signals transmitted on the mainbeam and sidelobes of a transmitting antenna and between signals transmitted on the mainbeam and sidelobes of a transmitting antenna array.

Additional features of the present invention are described in connection with the description of the preferred embodiments.

The present invention is applicable to communication systems utilizing infrared or acoustic radiation as well as to systems utilizing electromagnetic radiation.

DESCRIPTION OF THE PREFERRED EMBODIMENTS

Figure 1:
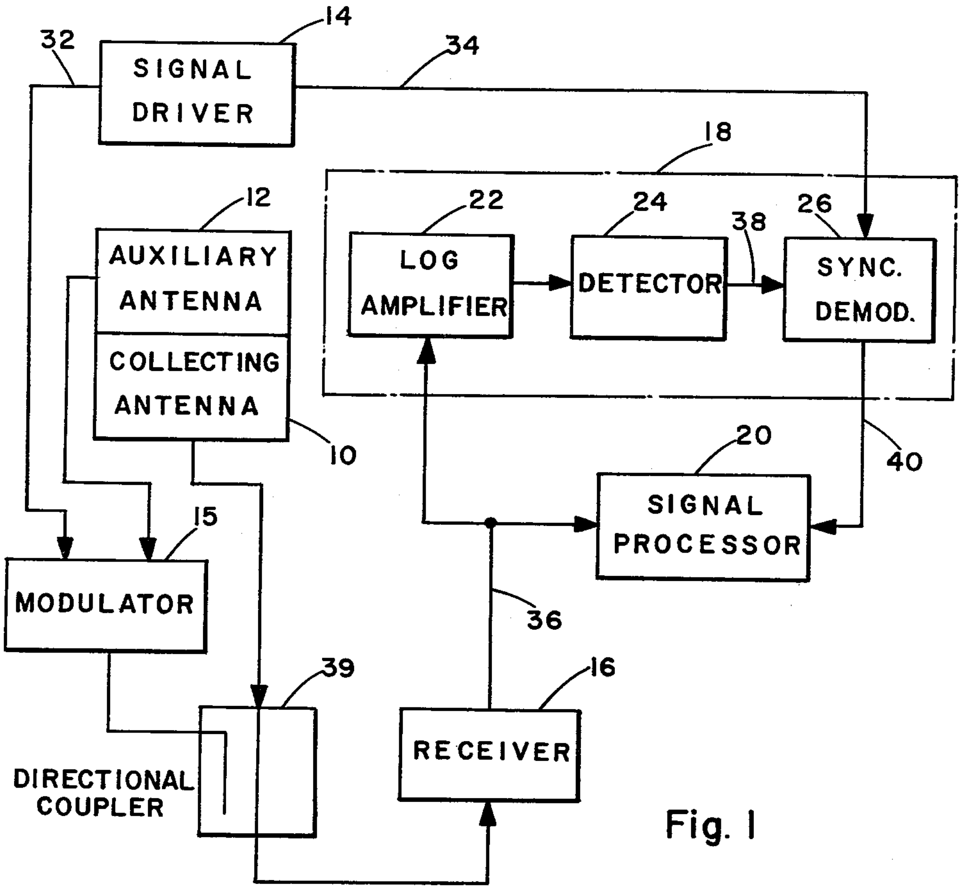
FIG. 1 is a block of one preferred embodiment of a sidelobe discriminator system of the present invention.

Referring to FIG. 1, a preferred embodiment of the sidelobe discriminator system of the present invention includes an RF collecting antenna 10, an auxiliary RF antenna 12, a signal driver 14, a modulator 15, a receiver 16, a detector system 18, and a signal processor 20. The detector system 18 includes a log amplifier 22 coupled to the output of the receiver 16, a detector 24 coupled to the output of the amplifier 22 and a synchronous demodulator 26 coupled to the output of the signal driver 14 and to the output of the detector 24.

Figure 2:
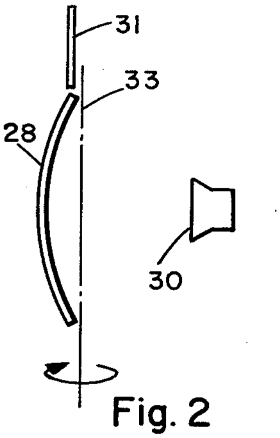
FIG. 2 is a schematic view showing one embodiment of the relative placement of the collecting antenna and the auxilary antenna in the system shown in FIG. 1.
Figure 3:
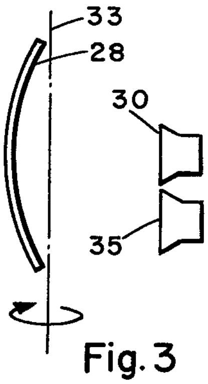
FIG. 3 is a schematic view showing another embodiment of the relative placement of the collecting antenna and the auxilary antenna in the system shown in FIG. 1.
Figure 4:
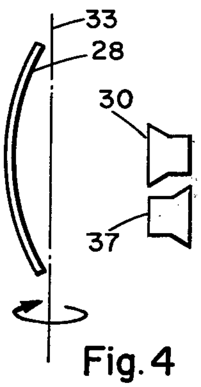
FIG. 4 is a schematic view showing still another embodiment of the relative placement of the collecting antenna and the auxiliary antenna in the system shown in FIG. 1.

Referring to FIGS. 2, 3 and 4, the collecting antenna 10 includes a reflector 28 and a feed assembly 30. In the preferred embodiment shown in FIG. 2, the auxiliary antenna is an omni-directional antenna 31. During scanning operations the reflector 28 is rotated about a vertical axis 33. The auxiliary antenna 31 is located to one side of the reflector 28 for receiving signals arriving on the radiation pattern of the auxiliary antenna 31 substantially coincident with the receipt of signals by the reflector 28 of the collecting antenna 10 on the sidelobes of the collecting antenna 10.

In the embodiment shown in FIG. 3, the auxiliary antenna is a separate antenna feed element 35 positioned adjacent the feed element 30 of the collecting antenna 10, and directed toward the reflector 28 of the collecting antenna 10 for receiving signals arriving on the radiation pattern of the auxiliary antenna 35 substantially coincident with the receipt of signals by the feed element 30 of the collecting antenna 10 on the sidelobes of said collecting antenna 10.

In the embodiment shown in FIG. 4, the auxiliary antenna is a separate antenna feed element 37 positioned adjacent the feed element 30 of the collecting antenna

10 and directed away from the reflector 28 of the collecting antenna 10 for receiving signals arriving on the radiation pattern of the auxiliary antenna 37 substantially coincident with the receipt of signals by the collecting antenna 10 on the sidelobes of said collecting antenna 10.

In the preferred embodiment shown in FIG. 1, the signal driver 14 provides a modulation signal on lines 32 and 34 having a predetermined modulation pattern. Various types of modulation schemes may be utilized, such as amplitude, phase, frequency, etc. In the preferred embodiment described herein the modulation signal on lines 32 and 34 has the predetermined modulation pattern shown in FIG. 5A. The modulator 15 is coupled to the signal driver 14 and the auxiliary antenna 12 for modulating signals received by the auxiliary antenna 12 to have the predetermined modulation pattern.

The receiver 16 is coupled to the antenna 10 and the modulator 15 by a directional coupler 39 for providing received signals on line 36 in response to both the signals arriving on the mainbeam and the sidelobes of the antenna 10, and the modulated signals from the modulator 15. The waveform of the received signal on line 36 is shown in FIG. 5B, with signal pulse 42 being derived from the sidelobe and signal pulse 44 being derived from the mainbeam.

Detection of the predetermined modulation pattern in the signals on line 36 is accomplished quite readily using conventional circuitry and filters provided that the predetermined modulation pattern on the sidelobes has a peak to peak variation that is appreciably greater than the peak to peak variation of the modulation pattern of the communication signal arriving on the mainbeam of the antenna.

Figure 5:
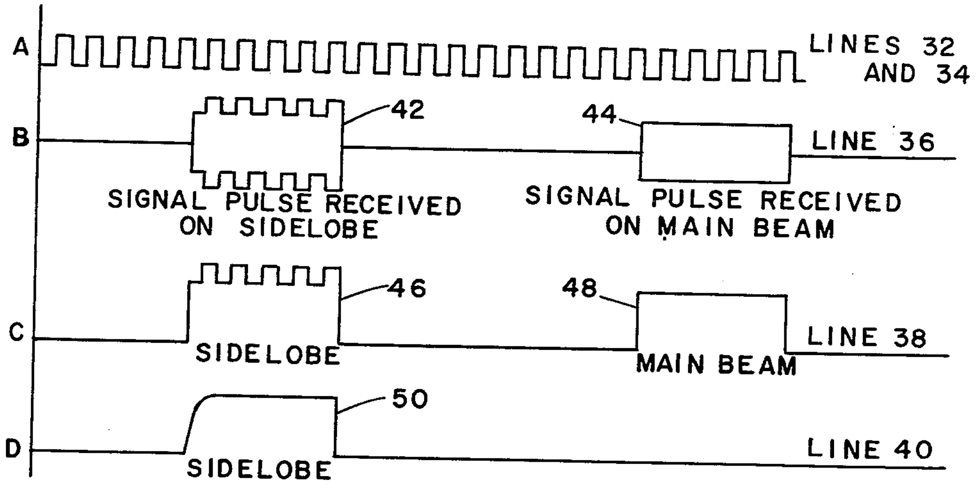
FIGS. 5A, 5B, 5C and 5D illustrate various waveforms produced in the system of FIG. 1.

In the detector system 18, the received signal on line 36 is amplified by the log amplifier 22, and the modulation pattern of the signal on line 36 is detected by the detector 24 to provide a signal on line 38 having a waveform such as that shown in FIG. 5C, wherein signal pulse 46 is derived from the sidelobe and signal pulse 48 is derived from the mainbeam. The synchronous demodulator 26 receives the signal on line 38 and responds to the modulation signal on line 34 to detect whether or not the signal on line 38 has the predetermined modulation pattern. When the signal on line 38 has the predetermined modulation pattern, the synchronous demodular 26 provides a flag identification signal pulse 50 on line 40, such as shown in FIG. 5D.

The signal on line 40 is provided to the signal processor 20 to indicate whether the received signal provided to the signal processor via line 36 is coincident with the signals arriving on the sidelobes on the collecting antenna 10.

The detector system 18 is merely exemplary. Other systems are well known to those skilled in the art for detecting received signals having the predetermined modulation pattern and thereby discriminating the detected signals as being received from signals arriving on the sidelobes.

In one alternative preferred embodiment, the connection via line 34 between the signal driver 14 and the detector system 18 may be omitted, and a reference signal, such as shown in FIG. 5A, is generated internally within the detector system 18 for enabling detection of signals on line 36 having the predetermined modulation pattern.

Figure 6:
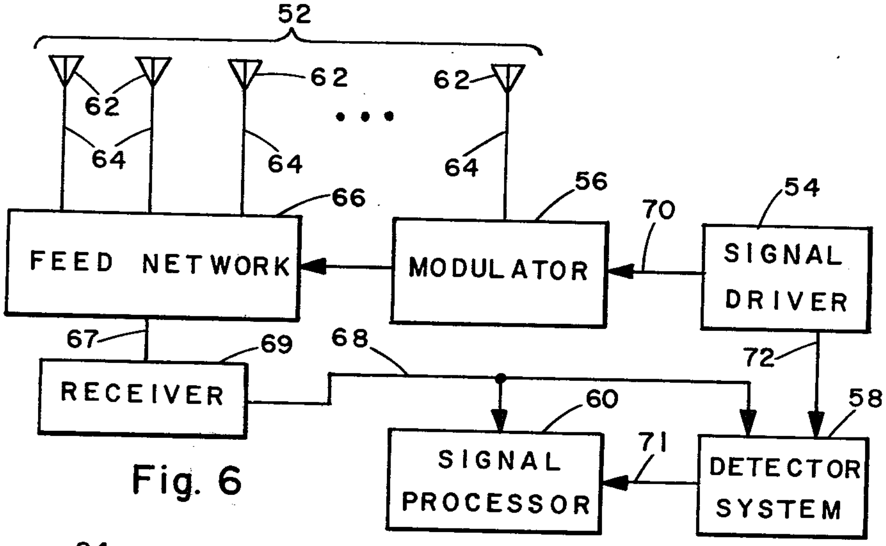
FIG. 6 is a block diagram of an alternative embodiment of a sidelobe discrimination system according to the present invention.

Referring to FIG. 6, another preferred embodiment of a sidelobe discriminator system of the present invention for discriminating between signals arriving on the mainbeam of a collecting antenna array 52 and signals arriving on the sidelobes of the array, includes the collecting antenna array 52, a signal driver 54, a modulator 56, a detector system 58 and a signal processor 60.

The collecting antenna array 52 includes a plurality of antenna elements 62 disposed in a predetermined array, a plurality of transmission lines 64 connected respectively to the antenna elements 62, a feed network 66 connected to the transmission lines for processing signals received by the antenna elements to provide signals on line 67 having a predetermined antenna array signal pattern including a mainbeam and sidelobes, and a receiver 69 coupled to the feed network 66 via line 67 for providing received signals on line 68.

The signal dirver 54 is adapted for providing a modulation signal having a predetermined modulation pattern on lines 70 and 72, such as the signal shown in FIG. 5A. The signal driver 54 is coupled to the feed network 66 for modulating signals arriving on the sidelobes of the array signal pattern to have the predetermned modulation pattern.

The detector system 58 is coupled to the feed network for detecting received signals on line 68 having the predetermined modulation pattern, such as signal pulse 42 in FIG. 5B, to thereby discriminate the detected signals on line 68 as being received from signals arriving on the sidelobes.

When the signal on line 68 has the predetermined modulation pattern, the detector system 58 provides a flag identification signal pulse on line 71, such as the pulse 50 shown in FIG. 5D.

The signal on line 71 is provided to the signal processor 60 to indicate whether the received signal provided to the signal processor 60 via line 68 is received from signals arriving on the sidelobes of the array pattern.

In one preferred embodiment of the system of FIG. 6, the detector system 58 is coupled to the signal driver 54, and is responsive to the modulation signal on line 72 for detecting the received signals having the predetermined modulation pattern. In an alternative preferred embodiment, the connection via line 72 between the signal driver 54 and the detector system 58 may be omitted, and a reference signal, such as shown in FIG. 5A, is generated internally within the detector system 58 for enabling detection of signals on line 68 having the predetermined modulation pattern.

In one preferred embodiment of the system of FIG. 6, a number of modulators 56 are coupled to the signal driver 54 via line 70 and are coupled to the respective transmission lines 64 that connect the feed network 66 to a corresponding number of antenna elements 62 for modulating signals arriving on the sidelobes of the array 52 to have the predetermined modulation pattern. In an alternative preferred embodiment, wherein the feed network 66 is an active feed network that includes control means for controlling the amplitude and phase of the signals received from the antenna elements, the modulator 56 is omitted, and the signal driver 54 is connected directly via line 70 to the control means in the feed network 66.

Figure 7:
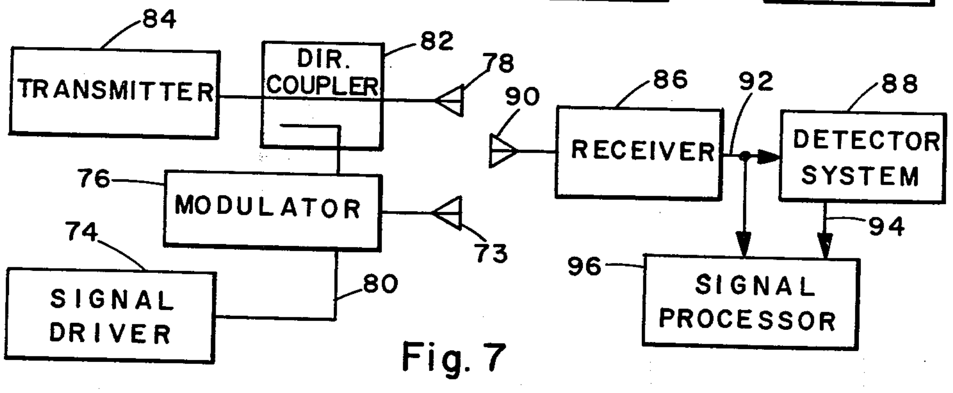
FIG. 7 is a block diagram of still another preferred embodiment of the sidelobe discrimination system of the present invention.

The present invention also provides a method and system for discriminating between signals transmitted on the mainbeam of a transmitting antenna and signals transmitted on the sidelobes of the transmitting antenna. Referring to FIG. 7, the system essentially includes an auxiliary antenna 73, a signal driver 74, a modulator 76, a receiver 86 and a detector system 88.

The auxiliary antenna 73 is positioned relative to a transmitting antenna 78 for transmitting signals on the radiation pattern of the auxiliary antenna 73 substantially coincident with the transmission of signals by the transmitting antenna 78 on the sidelobes of the transmitting antenna 78. The relative positioning of the auxiliary antenna 73 and the transmitting antenna 78 is the same as the relative positioning of the auxiliary antenna 12 and the collecing antenna 10, in the system of FIG. 1, as shown in FIGS. 2, 3 and 4.

The signal driver 74 provides a modulation signal having a predetermined modulation pattern on line 80, such as shown in FIG. 5A. The signal dirver 74 is coupled by the modulator 76 to the auxiliary antenna 73 for modulating the signals transmitted by the auxiliary antenna 73 to have the predetermined modulation pattern. The modulator 76 is coupled to the signal driver 74 and the auxiliary antenna 73 for modulating the signals transmitted by the auxiliary antenna 73 in response to said modulation signal on line 80.

Preferably, the auxiliary antenna 73 is coupled by a directional coupler 82 to the transmitter 84 for the transmitting antenna 78 for transmitting the same transmitted signal as the transmitting antenna 78.

The receiver 86 is coupled to a collecting antenna 90 for providing received signals on line 92 in response to the signals transmitted by the transmitting antenna 78 and the auxiliary antenna 73 and received by the collecting antenna 90.

The detector 88 is coupled to the receiver 86 for detecting received signals on line 92 having the predetermined modulation pattern such as the signal pulse shown in FIG. 5B, to thereby discriminate the detected signals as being coincident with the signals transmitted on the sidelobes of the transmitting antenna 78. When the signal on line 92 has the predetermined modulation pattern, the detector system 88 provides a flag identification signal pulse on line 94, such as the pulse 50 shown in FIG. 5D.

The signal on line 94 is provided to a signal processor 96 to indicate whether the received signal provided to the signal processor 96 via line 94 is coincident with the signals transmitted on the sidelobes of the transmitting antenna 78.

A reference signal, such as shown in FIG. 5A, is generated internally within the detector system 88 for enabling detection of signals on line 92 having the predetermined modulation pattern.

The present invention further provides a method and system for discriminating between signals transmitted on the mainbeam of a transmitting antenna array and signals transmitted on the sidelobes of the array. In this system, the antenna array 52 shown in FIG. 6 is adapted for transmitting a predetermined antenna array signal pattern including a mainbeam and sidelobes in response to signals provided by a transmitter (not shown) to the feed network 66.

The signal driver 54 (shown in FIG. 6) provides a modulation signal having a predetermined modulation pattern such as shown in FIG. 5A. The signal driver is coupled to the feed network 66 in the same manner as with the system of FIG. 6 for modulating signals transmitted on the sidelobes of the array signal pattern to have the predetermined modulation pattern. There are no direct connections between the antenna array 52 and a detector system and signal processor such as are shown in FIG. 6. Nor is the signal driver 54 connected to a detector system. Instead, the system of this embodiment includes a combination of collecting antenna, receiver, detector system and signal processor, such as are shown in FIG. 7, for discriminating detected signals as being received from signals transmitted on the sidelobes of the array pattern.

We claim:

1. A system for discriminating between signals arriving on the mainbeam of a collecting antenna and signals arriving on the sidelobes of the collecting antenna, comprising an auxiliary antenna positioned relative to said collecting antenna for receiving signals arriving on the radiation pattern of the auxiliary antenna substantially coincident with the receipt of signals by said collecting antenna on the sidelobes of said collecting antenna;

a signal driver for providing a modulation signal having a predetermined modulation pattern, wherein the signal driver is coupled to the auxiliary antenna for modulating said signals received by the auxiliary antenna to have said predetermined modulation pattern;

a receiver coupled to said collecting antenna and the auxiliary antenna for providing received signals in response to both the signals collected by said collecting antenna and said modulated from the auxiliary antenna; and a detector coupled to the receiver for detecting received signals having said predetermined modulation pattern to thereby discriminate said detected signals as being coincident with said signals arriving on the sidelobes of said collecting antenna, and for providing an identification signal to indicate whether the received signals is coincident with signals arriving on the sidelobes of the collecting antenna.

2. A system according to claim 1, wherein the detector is coupled to the signal driver and is responsive to said modulation signal for detecting said received signals having said predetermined modulation pattern.

3. A system according to claims 1 or 2, further comprising a modulator coupled to the signal driver and the auxiliary antenna for modulating said signals received by the auxiliary antenna in response to said modulation signal.

4. A system according to claims 1 or 2, further comprising a said collecting antenna.

5. A system for discriminating between signals arriving on the mainbeam of a collecting antenna array and signals arriving on the sidelobes of the array, comprising a collecting antenna array including a plurality of antenna elements disposed in a predetermined array, a plurality of transmission lines connected respectively to the antenna elements, and a feed network connected to the transmission lines for processing signals received by the antenna array signal pattern including a mainbeam and sidelobes;

a signal driver for providing a modulation signal having a predetermined modulation pattern, wherein the signal driver is coupled to the feed network for modulating signals arriving on the sidelobes of said array signal pattern to have said predetermined modulation pattern; and a detector coupled to the feed network for detecting received signals having said predetermined modulation pattern, to thereby discriminate said detected signals as being received from signals arriving on said sidelobes, and for providing an identification signal to indicate whether the received signal is coincident with signals arriving on the sidelobes of the array.

6. A system according to claim 5, wherein the detector is coupled to the signal driver and is responsive to said modulation signal for detecting said received signals having said predetermined modulation pattern.

7. A system according to claims 5 or 6, further comprising a number of modulators coupled to the signal driver and coupled to the respective transmission lines that connect the feed network to a corresponding number of antenna elements for modulating signals arriving on the sidelobes of the array to have said predetermined mined modulation pattern.

8. A system according to claims 5 or 6, wherein the feed network is an active feed network including control means for controlling the amplitude and phase of said signals received from the antenna elements, and the signal driver is connected to the control means.

9. A system for discriminating between signals transmitted on the mainbeam of a transmitting antenna and signals transmitted on the sidelobes of the transmitting antenna, comprising an auxiliary antenna positioned relative to a transmitting antenna for transmitting signals on the radiation of the auxiliary antenna substantially coincident with the transmission of signals by said transmitting antenna on the sidelobes of said transmitting antenna; a signal driver for providing a modulation signal having a predetermined modulation pattern, wherein the signal driver is coupled to the auxiliary antenna for modulating said signals transmitted by the auxiliary antenna to have said predetermined modulation pattern;

a receiver coupled to a collecting antenna for providing received signals in response to said signals transmitted by said transmitting antenna and said auxiliary antenna and received by said collecting antenna; and a detector coupled to the receiver for detecting received signals having said predetermined modulation pattern to thereby discriminate said detected signals as being coincident with said signals transmitted on the sidelobes of the transmitting antenna, and for providing an identification signal to indicate whether the received signal is coincident with signals transmitted on the sidelobes of the transmitting antenna.

10. A system according to claim 9, wherein the auxiliary antenna is coupled to a transmitter for said transmitting antenna for transmitting the same transmitted signal as said transmitting antenna.

11. A system according to claim 10, further comprising a modulator coupled to the signal driver and the auxiliary antenna for modulating said signals transmitted by the auxiliary antenna in response to said modulation signal.

12. A system according to claims 10 or 11, further comprising a said collecting antenna.

13. A system according to claims 10 or 11, further comprising a said transmitting antenna.

14. A system for discriminating between signals transmitted on the mainbeam of a transmitting antenna array and signals transmitted on the sidelobes of the array, comprising a transmitting antenna array including a plurality of antenna elements disposed in a predetermined array, a plurality of transmission lines connected respectively to the antenna elements, and a feed network connected to the transmission lines for processing signals provided to the antenna elements to transmit signals having a predetermined antenna array signal pattern including a mainbeam and sidelobes;

a signal driver for providing a modulation signal having a predetermined modulation pattern, wherein the signal driver is coupled to the feed network for modulating signals transmitted on the sidelobes of said array signal pattern to have said predetermined modulation pattern;

a receiver coupled to a collecting antenna for providing received signals in response to said mainbeam and sidelobe signals transmitted by the transmitting antenna array; and a detector coupled to the feed network for detecting received signals having said predetermined modulation pattern, to thereby discriminate said detected signals as being received from signals transmitted on said sidelobes, and for providing an identification signal to indicate whether the received signal is coincident with signals transmitted on the sidelobes of the array.

15. A system according to claim 14, further comprising a number of modulators coupled to the signal driver and coupled to the respective transmission lines that connect the feed network to a corresponding number of antenna elements for modulating signals transmitted on the sidelobes of the array to have said predetermined modulation pattern.

16. A system according to claim 14, wherein the feed network is an active feed network including control means for controlling the amplitude and phase of said signals transmitted from the antenna elements, and the signal driver is connected to the control means.

17. A method of discriminating between signals arriving on the mainbeam of a collecting antenna and signals arriving on the sidelobes of the collecting antenna, comprising the steps of (a) receiving signals on the mainbeam of an auxiliary antenna substantially coincident with the receipt of signals on the sidelobes of said collecting antenna;

(b) modulating said signals received by said auxiliary antenna to have a predetermined modulation pattern;

(c) providing received signals in response to both the signals collected by said collecting antenna and the modulated signals;

(d) detecting the received signals having said predetermined modulation pattern, to thereby discriminate said detected signals as being coincident with said signals arriving on the sidelobes of said collecting antenna; and (e) providing an identification signal in response to said detection for indicating whether the received signal is coincident with signals arriving on the sidelobes of the collecting antenna.

18. A method of discriminating between signals arriving on the mainbeam and on the sidelobes of a collecting antenna array that includes a plurality of antenna elements disposed in a predetermined array; a plurality of transmission lines connected respectively to the antenna elements and a feed network connected to the transmission lines for processing signals received by the antenna elements to provide received signals having a predetermined antenna array signal pattern including a mainbeam and sidelobes, comprising the steps of (a) modulating signals arriving on the sidelobes of said array signal pattern to have a predetermined modulation pattern;

(b) detecting received signals having said predetermined modulation pattern, to thereby discriminate said detected signals as being received from signals arriving on said sidelobes, and (c) providing an identification signal in response to said detection for indicating whether the received signal is coincident with signals arriving on the sidelobes of the array.

19. A method of discriminating between signals transmitted on the mainbeam of a transmitting antenna and signals transmitted on the sidelobes of the transmitting antenna, comprising the steps of (a) transmitting signals on the radiation pattern of an auxiliary antenna substantially coincident with the transmission of signals on the sidelobes of said transmitting antenna;

(b) modulating said signals transmitted by said auxiliary antenna to have a predetermined modulation pattern;

(c) providing received signals in response to said signals transmitted by said transmitting antenna and said auxiliary antenna;

(d) detecting the received signals having said predetermined modulation pattern, to thereby discriminate said detected signals as being coincident with said signals transmitted on the sidelobes of said transmitting antenna; and (e) providing an identification signal in response to said detection for indicating whether the received signal is coincident with signals transmitted on the sidelobes of the transmitting antenna.

20. A method of discriminating between signals transmitted on the mainbeam and on the sidelobes of a transmitting antenna array that includes a plurality of antenna elements disposed in a predetermined array; a plurality of transmission lines connected respectively to the antenna elements and a feed network connected to the transmission lines for processing signals provided to the antenna elements to transmit signals having a predetermined antenna array signal pattern including a mainbeam and sidelobes, comprising the steps of (a) modulating signals transmitted on the sidelobes of said array signal pattern to have a predetermined modulation pattern; and (b) providing received signals in response to said transmitted signals from said transmitting antenna array;

(c) detecting received signals having said predetermined modulation pattern, to thereby discriminate said detected signals as being received from signals transmitted on said sidelobes; and (d) providing an identification signal in response to said detection for indicating whether the received signal is coincident with signals transmitted on the sidelobes of the array.

21. A system according to claim 1, further comprising a signal processor coupled to the receiver and the detector for processing signals from the receiver in response to the identification signal.

22. A system according to claim 5 further comprising a signal processor coupled to the receiver and the detector for processing signals from the receiver and the detector for processing signals from the receiver in response to the identification signal.

23. A system according to claim 9, further comprising a signal processor coupled to the receiver and the detector for processing signals from the receiver in response to the identification signal.

24. A system according to claim 14, further comprising a signal processor coupled to the receiver and the detector for processing signals from the receiver in response to the identification signal.

25. A method according to claim 17 further comprising the step of:

(f) processing received signals in response to the identification signal.

26. A method according to claim 18 further comprising the step of:

(d) processing received signals in response to the identification signal.

27. A method according to claim 19 further comprising the step of:

(f) processing received signals in response to the identification signal.

28. A method according to claim 20 further comprising the step of:

(e) processing received signals in response to the identification signal.

* * * * *